United States Patent [19]

Yamamori et al.

[11] Patent Number: 5,677,360
[45] Date of Patent: Oct. 14, 1997

[54] HYDROPHILIC POLYMER ALLOY, FIBER AND POROUS MEMBRANE COMPRISING THIS POLYMER ALLOY, AND METHODS FOR PREPARING THEM

[75] Inventors: Hisayoshi Yamamori; Makoto Uchida; Kenji Niikawa, all of Nagoya; Toshinobu Koshoji, Otake, all of Japan

[73] Assignee: Mitsubishi Rayon Co., Ltd., Tokyo, Japan

[21] Appl. No.: 459,633

[22] Filed: Jun. 2, 1995

Related U.S. Application Data

[63] Continuation of Ser. No. 941,053, filed as PCT/JP92/00143, Feb. 13, 1992, published as WO92/14783, Sep. 3, 1992, abandoned.

[30] Foreign Application Priority Data

| Feb. 13, 1991 | [JP] | Japan | 3-020064 |
| Apr. 5, 1991 | [JP] | Japan | 3-072697 |
| Nov. 28, 1991 | [JP] | Japan | 3-314975 |

[51] Int. Cl.$^6$ ................................. B29C 47/88
[52] U.S. Cl. ............... 521/134; 521/61; 521/75; 521/79; 521/141; 525/56; 525/57; 525/58; 264/211.13; 264/211.19; 264/185; 264/203; 210/500.21; 210/500.36
[58] Field of Search ............... 521/134, 61, 75, 521/79, 141; 525/56, 57, 58; 264/185, 203, 211.13, 211.19; 210/500.21, 500.36

[56] References Cited

U.S. PATENT DOCUMENTS

| 3,710,795 | 1/1973 | Higuchi et al. | 424/424 |
| 4,100,238 | 7/1978 | Shinomura | 264/49 |
| 4,134,837 | 1/1979 | Yamashita et al. | 210/500 M |
| 4,294,935 | 10/1981 | Kodera et al. | 525/60 |
| 4,362,844 | 12/1982 | Lemstra et al. | 525/57 |
| 4,575,532 | 3/1986 | Schmukler et al. | 525/57 |
| 4,620,955 | 11/1986 | Kono et al. | 521/64 |
| 4,826,908 | 5/1989 | Cunningham et al. | 525/57 |
| 4,868,222 | 9/1989 | Chau et al. | 521/134 |
| 5,057,218 | 10/1991 | Koshaji et al. | 210/500.35 |
| 5,080,646 | 1/1992 | Theeuwes et al. | 604/20 |
| 5,084,173 | 1/1992 | Nitadori et al. | 427/245 |
| 5,176,953 | 1/1993 | Jacoby et al. | 521/143 |
| 5,232,642 | 8/1993 | Kamo et al. | 264/41 |
| 5,274,030 | 12/1993 | Audry et al. | 525/57 |

FOREIGN PATENT DOCUMENTS

| 0203 459 | 12/1986 | European Pat. Off. . |
| 0438 598 | 7/1991 | European Pat. Off. . |
| 1 314 756 | 12/1942 | France . |
| 2 055 193 | 3/1971 | Germany . |
| 39-8068 | 5/1964 | Japan . |
| 48-20888 | 6/1973 | Japan . |
| 53-24976 | 7/1978 | Japan . |
| 54-32851 | 10/1979 | Japan . |
| 55-22502 | 6/1990 | Japan . |

OTHER PUBLICATIONS

Database WPIL, AN–85–084121 JP–A–60 035 061, Feb. 22, 1985.
Database WPIL, AN–90–198997, JP–A–2 133 607, May 22, 1990.

Primary Examiner—Mark L. Warzel
Attorney, Agent, or Firm—Oblon, Spivak, McClelland, Maier & Neustadt, P.C.

[57] ABSTRACT

A hydrophilic polymer alloy which has a permanent hydrophilic nature, a sufficient mechanical strength and a high safety and which is suitable for the formation of hydrophilic porous membranes manufacturable by an industrially advantageous process can be prepared by blending an amorphous hydrophilic copolymer (X) containing 10 mole % or more of an ethylene unit, 10 to 60 mole % of a vinyl alcohol unit and 1 mole % or more of a vinyl acetate unit with a polyolefin (Y). Furthermore, this polymer alloy is also suitable for the formation of hydrophilic (porous) fibers having a sufficient mechanical strength and antistatic function.

3 Claims, No Drawings

HYDROPHILIC POLYMER ALLOY, FIBER AND POROUS MEMBRANE COMPRISING THIS POLYMER ALLOY, AND METHODS FOR PREPARING THEM

This application is a continuation of application Ser. No. 07/941,053, filed on Dec. 9, 1992, now abandoned, which was filed as International Application No. PCT/JP92/00143 on Feb. 13, 1992, published as WO92/14783, Sep. 3, 1992 now abandoned.

1. Technical Field

The present invention relates to a hydrophilic polymer alloy suitable as a material for forming films and fibers having an antistatic function, and as a material for forming porous membranes having a permanent hydrophilic nature and a high safety for use in treatments of various aqueous liquids such as medical and industrial filtration and separation, and it also relates to a method for preparing the hydrophilic polymer alloy.

Furthermore, the present invention relates to a fiber and a porous membrane comprising this hydrophilic polymer alloy, and methods for preparing them.

2. Background Art

With the enlargement of applications of polymer products, various characteristics are required for polymer materials. Examples of such characteristics include a hydrophilic nature and antistatic properties.

The hydrophilic polymer materials can be utilized for (a) the formation of porous membranes for use in various treatments such as the filtration and the substance exchange of aqueous liquids mainly comprising water, (b) the molding of films for forming a multi-layer laminate structure having various functions by adhering with an adhesive for hydrophilic surfaces, and (c) the formation of hydrophilic fibers for textiles which require dyeing.

On the other hand, the materials having the antistatic function are useful for the formation of industrial fiber products and films in which charging is dangerous or unpreferable, and the formation of usual clothes, various fiber products and films in which charging gives displeasure.

For the materials for use in these applications, there are usually required a feature that mechanical strength is sufficient, a feature that necessary properties are permanent, and a feature that products can be prepared by an industrially advantageous process. The development of materials which can meet these requirements have been widely carried out.

The hydrophilic porous membranes are utilized in a medical field, for example, as filtration membranes for use in the separation of plasma, the filtration of infusion, the separation of plasma protein, the preparation of aseptic water and the like, and in an industrial field, as filtration membranes for use in the preparation of washing water for IC, the preparation of water for the manufacture and processing of foods, the purification of water for various processes and the like. In addition, nowadays, the hydrophilic porous membranes are also often utilized as filtration membranes for use in water purifiers for homes and restaurants.

The materials for use in the formation of the porous membranes for these applications are further required to have a high safety in addition to the above-mentioned properties.

However, a few of the conventional porous membranes for the treatment of aqueous liquids can meet all of the above-mentioned requirements, and the demand of polymer materials which can meet these requirements has been increasing.

Heretofore, the porous membranes comprising various materials and having various porous structures have been suggested, but above all, there are remarked the porous membranes which can be obtained by melt-shaping a crystalline thermoplastic polymer such as a polyolefin into a hollow fiber form, a tube form or a film form, stretching the shaped articles at a relatively low temperature to generate a craze in an amorphous region between crystalline lamellas, and further hot-stretching them to give a porous structure to the melt-shaped articles. In these porous membranes, neither an additive nor a solvent is not used, and therefore impurities and various components contained in the porous membranes are not dissolved in a liquid to be treated which is brought into contact with the membranes. Thus, the porous membranes are suitable for applications which must avoid the dissolution of them.

As such porous membranes, Japanese Patent Application Laid-open Nos. 137026/1977 and 66114/1982 disclose hollow fiber membranes, and U.S. Pat. No. 3679538 and Japanese Patent Publication No. 32531/1980 disclose flat membranes.

The porous membranes obtained by such a method comprise a polyolefin or a fluorinated polyolefin alone, and since the material of these membranes is substantially hydrophobic, membrane surfaces inclusive of pore surfaces of the obtained porous membranes are hydrophobic. Accordingly, the porous membranes have a drawback that a high pressure is necessary for the penetration of an aqueous liquid through the membranes. In consequence, it is not practical to directly use the porous membranes for the treatment of the aqueous liquid.

Thus, such porous membranes are usually treated with an agent for giving a hydrophilic nature (hereinafter referred to as "hydrophilic agent") such as an alcohol or a surface-active agent to give the hydrophilic nature to the porous membranes, and afterward they are used for the treatment of the aqueous liquid.

However, the treatment with the hydrophilic agent only permits obtaining a temporary hydrophilic nature. When the porous membrane is dried, the membrane surfaces return to the hydrophobic nature again. Therefore, in the case that such a treatment is used, there is a problem that once treated with the hydrophilic agent, the porous membranes must be maintained in a wet state, for example, by replacing the hydrophilic agent with water and always keeping the membrane surfaces inclusive of the pore surfaces in contact with water.

Furthermore, when the porous membranes are used for filtration while the hydrophilic agent still adheres thereto, the hydrophilic agent transfers from the porous membranes into a filtrate to contaminate it. Therefore, it is necessary to sufficiently remove the hydrophilic agent from the porous membranes by washing prior to using in the filtration treatment.

In contrast to the process using the hydrophilic agent such as an alcohol, as a technique for providing the hydrophobic porous membranes with the permanent hydrophilic nature, there is a process which comprises covering the film surfaces inclusive of the pore surfaces with a hydrophilic monomer such as acrylic acid, methacrylic acid or vinyl acetate, and then irradiating the monomer with an ionizing radiation of about 1 to 10 megarads to chemically fix it on the membrane surfaces. This process is disclosed in Japanese Patent Application Laid-open No. 38333/1981.

According to this process, a group for exerting the hydrophilic nature is fixed on the porous membranes, and therefore the permanent hydrophilic nature can be accomplished.

However, in this process, it is necessary to irradiate with the ionizing radiation, and thus facilities on a large scale are required and the stability of the steps is insufficient. In addition, the membrane material might be damaged to noticeably lower its mechanical strength sometimes, and it is difficult to operate and control the treatment steps.

As another technique to obtain the porous membranes having the hydrophilic nature from a hydrophobic material, Japanese Patent Application Laid-open No. 137208/1980 discloses a method for making the membrane surfaces inclusive of the pore surfaces hydrophilic which comprises melt-spinning and then stretching a blend of different kinds of polymers, cleaving intersurfaces between these different polymers to form porous hollow fiber membranes, and then subjecting side chain groups present in the polymer constituting the obtained hollow fiber membranes to a post-treatment such as hydrolysis or sulfonation to convert these groups into hydrophilic groups, whereby the membrane surfaces inclusive of the pore surfaces can be made hydrophilic.

However, in this method, the porosity of the obtained porous structure is usually low, and so applications are limited. In addition, a post-treatment such as hydrolysis or sulfonation is necessary, so that the process is complex.

Moreover, in Japanese Patent Publication No. 39406/1986, it has been suggested that hollow fibers formed from a blend of a polyethylene and an ethylene-vinyl acetate copolymer are made porous, and then subjected to a saponification treatment to prepare porous hollow fiber membranes having excellent water retention. However, this method requires that the saponification treatment is stably carried out, and so it is necessary to maintain an alkali concentration in a reaction vessel at a constant level. In addition, a relatively long reaction time is required, so that a manufacturing cost is high. Moreover, there is a problem that the strength of the hollow fiber membranes themselves deteriorates owing to the function of an alkali such as sodium hydroxide which is used as a saponifier.

Furthermore, as a process for obtaining the porous membranes having the permanent hydrophilic nature, there is also a method for forming the porous membrane by the use of a hydrophilic polymer material such as an ethylene-vinyl alcohol copolymer. However, this method has a disadvantage that melt-shaping and stretch cannot be utilized to make the membranes porous.

That is, the ethylene-vinyl alcohol copolymer has a higher crystallization temperature than a crystal dispersion temperature, and even if such a hydrophilic polymer is subjected to melt-shaping and stretch, it is impossible to make the membranes porous. Therefore, there is only employed a wet solidification method or a preparation process of the porous membranes by blend of other components and extraction thereof. The membranes obtained by such a method are relatively poor in mechanical strength, as compared with the porous membranes obtained by the melt-shaping and stretch method. In addition, the membranes made from an entirely hydrophilic material swell in a wet state, so that their structure changes. Hence, such membranes have poor strength in the wet state and a drawback that mechanical strength deteriorates owing to the repetition of wetting and drying.

On the other hand, the hydrophilic films or fibers prepared from a hydrophilic polymer usually have a low mechanical strength, and so they are limited in applications in which the high mechanical strength is required. Thus, the demand of the hydrophilic materials having the sufficient mechanical strength has been increasing.

Furthermore, the films or fibers having an antistatic function are formable by the use of a hydrophilic polymer material, but as in the above-mentioned case, the mechanical strength of the hydrophilic polymer is usually low, and therefore its utilization in the applications in which the high strength is required is limited. In view of such situations, as products which can be utilized in the applications in which the high strength is required, it has been developed to prepare fibers or films from a hydrophobic polymer having the high mechanical strength and containing a material having a high conductivity for the prevention of charging.

However, in the case that a low-molecular weight compound is used as the material having the high conductivity, there is a problem that the low-molecular weight compound oozes out while the films or fibers including it are used. When such a material is a polymer, its compatibility is poor. Thus, when they are only blended, phase separation occurs, so that the extremely thin fibers or films cannot be prepared. In addition, there is a problem that the mechanical strength of such fibers or films are also poor.

DISCLOSURE OF THE INVENTION

The present invention has been attained in view of circumstances regarding the above-mentioned hydrophilic porous membranes, polymer products of hydrophilic films, fibers and the like, and materials for the formation of the polymer products of antistatic films, fibers and the like. It has been found that a polyolefin-based hydrophilic polymer alloy comprising specific components meets characteristics required for these products, and the present invention has been completed.

An object of the present invention is to provide a hydrophilic polymer alloy which has a permanent hydrophilic nature, a sufficient mechanical strength and a high stability and which is suitable for the formation of a hydrophilic porous membrane manufacturable by an industrially advantageous process, and a method for preparing this hydrophilic polymer alloy.

Another object of the present invention is to provide a porous membrane comprising this hydrophilic polymer alloy, and a method for preparing the same.

Still another object of the present invention is to provide a hydrophilic polymer alloy suitable for the formation of a polymer product such as a fiber, a film and the like having an antistatic function, a permanent hydrophilic nature and a sufficient mechanical strength, and a method for preparing the same.

A further object of the present invention is to provide a fiber having an antistatic function which comprises the hydrophilic polymer alloy, and a method for preparing the same.

A still further object of the present invention is to provide a hydrophilic polymer alloy which is suitable for the formation of a porous fiber having a permanent hydrophilic nature, a high mechanical strength, a porous structure for the intention of lightweight, and excellent feeling and sanitation.

A still further object of the present invention is to provide a porous fiber comprising the hydrophilic polymer alloy.

A hydrophilic polymer alloy of the present invention which can accomplish these objects is characterized by blending (a) an amorphous hydrophilic copolymer (X) containing 10 mole % or more of an ethylene unit, 10 to 60 mole % of a vinyl alcohol unit and 1 mole % or more of a vinyl acetate unit with (b) a polyolefin (Y).

The hydrophilic copolymer (X) which is used in the preparation of the hydrophilic polymer alloy of the present invention comprises at least three components of the above-mentioned ethylene unit, vinyl alcohol unit and vinyl acetate unit, but a fourth compound can be additionally used, so long as it does not impair the effect of the present invention. This fourth component is such that a cohesive energy per unit of the sum of vinyl acetate and this fourth component lies between the vinyl alcohol unit and the polyolefin (Y). In general, if the amount of the fourth component is 1 mole % or less of the vinyl acetate unit, a problem is scarcely present. When having the cohesive energy near to that of the vinyl acetate unit, the fourth component may be contained on condition that its amount is less than 50 mole % with respect to the total of the vinyl acetate unit and the fourth component.

A fiber having a permanent hydrophilic nature and an antistatic function can be obtained by melt-spinning the hydrophilic polymer alloy. Furthermore, by stretching after the melt-spinning of the hydrophilic polymer alloy the porous fiber can be obtained which has a permanent hydrophilic nature, a sufficient mechanical strength, a porous structure for the intention of lightweight, and excellent feeling and sanitation.

In addition, a molded article such as a film having a permanent hydrophilic nature and an antistatic function can be obtained by melt-shaping the hydrophilic polymer alloy.

Moreover, a hydrophilic porous membrane can be obtained by melt-shaping the hydrophilic polymer alloy, thermally treating it at a temperature of not less than its crystal dispersion temperature and less than its melting point to increase crystallinity, and then carrying out a stretching treatment to make the resultant membrane porous.

The thus obtained porous membrane has a permanent hydrophilic nature, and when treated in an aqueous liquid, the components constituting the porous membrane neither separate nor dissolve in the aqueous liquid, so that the aqueous liquid is not contaminated and safety is high. Furthermore, a melt-shaping type stretch method which is industrially advantageous for the formation of the porous membrane can be utilized, and so it is possible to reduce a production cost.

BEST MODE FOR CARRYING OUT THE INVENTION

A hydrophilic polymer alloy of the present invention is a blend of an amorphous hydrophilic copolymer (X) comprising the above-mentioned specific composition and a polyolefin (Y).

An ethylene unit constituting the hydrophilic copolymer (X) is represented by $-CH_2CH_2-$, and this unit can be introduced into the copolymer by using ethylene as a monomer. A vinyl acetate unit is represented by $-CH_2CH(OCOCH_3)-$, and this unit can be introduced into the copolymer by using vinyl acetate as a monomer, or by converting another unit such as a hydroxyl group of a vinyl alcohol unit into an acetyl group. Moreover, the vinyl alcohol unit is represented by $-CH_2CH(OH)-$, and this unit can be introduced into the copolymer by hydrolyzing the vinyl acetate unit.

The hydrophilic copolymer (X) may be a copolymer of a random type, a graft type or the like. However, if a crystalline component having a higher crystallization temperature than the crystal dispersion temperature of the polyolefin (Y) is present in the hydrophilic copolymer (X), the compatibility of the hydrophilic copolymer (X) with the polyolefin (Y) deteriorates in a blend step, so that a domain of the hydrophilic copolymer (X) is formed in the polymer alloy, with the result that a stable melt-shaping cannot be carried out, or the peeling of the crystalline component from the domain phase unpreferably tends to occur at the time of stretching. Therefore, as the hydrophilic copolymer (X), an amorphous component is utilized. For example, if any alignment of four or more continuous vinyl alcohol repeating units is not present in the copolymer, the copolymer is amorphous. However, even if the alignment of the four or more continuous vinyl alcohol repeating units is included in the hydrophilic copolymer (X), there is no problem, so long as the repeating units do not impair the amorphous properties. In order to obtain the hydrophilic state, the undermentioned technique can be utilized.

Furthermore, when the content of the ethylene unit in the hydrophilic copolymer (X) is less than 10 mole %, the compatibility of the hydrophilic copolymer (X) with the polyolefin (Y) is low, and the hydrophilic copolymer (X) is easily dissolved from the polymer alloy into the aqueous liquid unpreferably, when the polymer alloy is brought into contact with the aqueous liquid.

When the content of the vinyl alcohol unit in the hydrophilic copolymer (X) is less than 10 mole %, a hydrophilic nature cannot be sufficiently given to the polymer alloy. When the content is more than 60 mole %, the compatibility of the hydrophilic copolymer (X) with the polyolefin (Y) deteriorates, and in addition, the above-mentioned crystalline component is formed on the basis of the vinyl alcohol unit and at the time of blending, crystals are unpreferably grown in the crystalline component with a high possibility.

In order to obtain the good hydrophilic nature, it is preferred that the content of the vinyl alcohol unit is 20 mole % or more.

Vinyl acetate is such that its cohesive energy lies substantially in the middle of the vinyl alcohol unit and the polyolefin (Y). When 1 mole % or more of the vinyl acetate unit is contained, the components (X) and (Y) are in a proper range, so that the component (X) is not completely compatibilized with the component (Y), with the result that the interface portions of both are mutually dissolved, whereby the adhesive properties of both the components can be enhanced.

Preferable examples of the polyolefin (Y) include crystalline compounds such as high-density polyethylenes, polypropylenes, poly-3-methylpentene-1 and poly-4-methylpentene-1. Examples of the high-density polyethylenes have a glass transition temperature (Tg) of $-120°$ C., a plastic deformation temperature of 80° C. and a melting point of 135° C. Moreover, examples of the polypropylenes have a glass transition temperature (Tg) of $-15°$ C., a plastic deformation temperature of 120° C. and a melting point of 165° C.

No particular restriction is put on a content ratio of the hydrophilic copolymer (X) and the polyolefin (Y) in the polymer alloy of the present invention, and a content ratio thereof can be decided in accordance with the amount of the ethylene unit contained in the hydrophilic copolymer (x).

In general, when the content of the ethylene unit in the hydrophilic copolymer (X) is low, the hydrophilic nature is shown even if the content of the hydrophilic copolymer (X) is low. However, when the content of the ethylene unit is high, it is necessary to increase the content of the hydrophilic copolymer (X).

The hydrophilic copolymer (X) can be obtained by partially hydrolyzing a vinyl acetate unit of an ethylene-vinyl acetate copolymer containing at least 10 mole % of the ethylene unit under such conditions as to leave at least 1 mole % of the vinyl acetate unit and as to produce 20 to 80 mole % of a vinyl alcohol unit.

This hydrolysis treatment can be carried out, for example, by adding 300 to 1000 parts by weight of methanol, 0 to 100 parts by weight of water and 0.01 to 0.3 part by weight of sodium hydroxide to 100 parts by weight of the ethylene-vinyl acetate copolymer, mixing them in a vessel, and then reacting them at a temperature of from 20° to 60° C. The formed hydrophilic copolymer (X) can be recovered by mixing the reaction mixture obtained by the hydrolysis treatment with water having a temperature of not less than a volatilization temperature of methanol, taking out masses of the hydrophilic copolymer (X) therefrom, dehydrating them by a mangle or the like, and then drying them with hot air or the like.

Furthermore, the hydrophilic copolymer (X) can be obtained by partially converting the hydroxyl group of the vinyl alcohol unit of an ethylene-vinyl alcohol copolymer containing at least 10 mole % of the ethylene unit into an acetyl group under such conditions as to format least 1 mole % of the vinyl acetate unit and as to leave 20 to 80 mole % of the vinyl alcohol unit.

The conversion of the vinyl alcohol unit into the vinyl acetate unit can be achieved by adding 50 to 400 parts by weight of water, 300 to 1000 parts by weight (preferably 500 to 700 parts by weight) of glacial acetic acid and 20 to 50 parts by weight of 10 N hydrochloric acid to 100 parts by weight of the ethylene-vinyl alcohol copolymer in a vessel, and then reacting them at a temperature of from 20° to 70° C. The reaction mixture obtained by this reaction is mixed with an aqueous alkali solution containing an alkali equal to or more than moles of acetic acid contained in the reaction mixture to neutralize acetic acid in the system, and the thus formed hydrophilic copolymer (X) is then taken out. The thus obtained hydrophilic copolymer (X) is washed with water and then dried. Examples of the aqueous alkali solution here used include an aqueous sodium hydroxide solution and the like, and if the above-mentioned amount of the alkali is present in the neutralization treatment of acetic acid, any pH value is acceptable.

The polymer alloy of the present invention can be obtained by a method in which the hydrophilic copolymer (X) is blended with the polyolefin (X), for example, by a blender such as a V type blender, a method in which they are melted and blended in a melt extruder and then pelletized, or another method.

The blending can be carried out at a temperature in the range of from (Tm+10° C.) to (Tm+80° C.) on the basis of a melting point (Tm) of the polyolefin (Y).

The polymer alloy of the present invention can be melt-shaped into a desired form by the utilization of various molding techniques such as extrusion, injection and vacuum forming, and if necessary, it may be made porous, to obtain various molded articles such as films, fibers and porous membranes.

For example, the hydrophilic film having an antistatic function can be prepared by melting the polymer alloy at its melting point, i.e., at a temperature in the range of from (Tm +10° C.) to (Tm +100° C.) on the basis of a melting point (Tm) of the polyolefin (Y) contained therein, and then molding it by a T-die type extruder or the like which can be utilized in usual film molding.

In the case that the polymer alloy is used to prepare the hydrophilic film, a blend ratio of the hydrophilic copolymer (X) and the polyolefin (Y) in the polymer alloy can be selected in compliance with the desired application of the film, but for example, the blend amount of the hydrophilic copolymer (X) may be in the range of from 10 to 30% by weight based on the total weight of the hydrophilic copolymer (X) and the polyolefin (Y).

The obtained film is useful as an antistatic film, and it is also useful for the formation of a functional multi-layer structure such as a laminate film for the prevention of dew condensation by the use of an adhesive for a hydrophilic surface.

No particular restriction is put on the porosity, pore diameter, thickness of the hydrophilic porous membrane obtained from the polymer alloy of the present invention, and they are decided in compliance with their applications. For example, the porosity is from about 40 to 80%, the pore diameter measured by a mercury porosimeter is from about 0.01 to 3 μm, and the membrane thickness is from about 10 to 200 μm. In the case of the hollow fiber membrane prepared from the porous membrane, its internal diameter is from about 50 to 2000 μm.

The porous structure is a structure in which the pores are three-dimensionally connected to one another, and the structures formed by the above-mentioned various methods can be utilized. Above all, in view of the mechanical strength and the retarded rise of pressure loss attributed to the clogging and the like of the porous membrane, the porous membrane preferably has a structure in which spaces surrounded with lamellas and many fibrils mutually joining the lamellas and aligned in a longitudinal direction are three-dimensionally connected to one another.

The porous membranes may take the conformations of flat membranes, circular membranes, hollow fiber membranes and the like.

The porous membrane can be prepared by various methods such as a method of the combination of a melt-shaping type and extraction in which a blend of a material to be extracted for pore formation and a material is melt-shaped, and the material to be extracted is then extracted to make the resultant membrane porous; and a melt-shaping type stretch method in which a material is melt-shaped and then stretched to make the resultant membrane porous. Above all, the melt-shaping type stretch method comprising the combination of the melt-shaping type and the stretch for giving the porous nature is preferable, taking it into consideration that the porous membrane can be manufactured inexpensively on an industrial scale thereby.

Now, the formation of the film by the melt-shaping type stretch method will be described.

In the first place, the above-mentioned hydrophilic copolymer (X) is sufficiently uniformly blended with the polyolefin (Y) in a desired mixing ratio to obtain a polymer alloy.

No particular restriction is put on the mixing ratio of the hydrophilic copolymer (X) and the polyolefin (Y), but if the hydrophilic copolymer (X) in which the content of the ethylene unit is low is blended in large quantities in the polymer alloy, the sufficient growth of the lamella crystals necessary for the porous state formation by the stretching treatment in the melt-shaped material tends to be easily impeded. On the other hand, even if the hydrophilic copolymer (X) in which the ethylene content is high is blended in large quantities, the growth of the lamella crystals necessary for the porous state formation in the melt-shaped article is scarcely impeded. Therefore, in the case of the melt-shaping type stretch method, it is desirable to select the blend ratio between the hydrophilic copolymer (X) and the polyolefin (Y), considering the above-mentioned points. For example, in the case that the melt-shaping type stretch method is used for the formation of the porous membrane, it is preferable that the blend amount of the polyolefin (Y) is in the range of from about 95 to 50% by weight based on the total weight of the hydrophilic copolymer (X) and the polyolefin (Y). Furthermore, in the case that the increase of the porosity is necessary in order to give a high water permeability to the porous membrane formed by the melt-shaping type stretch method, it is preferable that the blend amount of the polyolefin (Y) is 74% by weight or more based on the total weight of the hydrophilic copolymer (X) and the polyolefin (Y).

Next, this polymer alloy is melt-shaped by a melt extruder for the molding of usual films, hollow fibers and the like. As a nozzle for the hollow fiber membrane, there can be used a double pipe type nozzle or a horse's hoof type nozzle. In the case of the double pipe type nozzle, the hollow fiber having a uniform peripheral wall thickness can be obtained. As the extruder for the film formation, various molding machines such as a T-die for the flat films and a double pipe type die for the tubular films can be used. In the case of molding the flat films, an amount of air to be internally blown can be suitably adjusted to obtain the films having a desired wall thickness and width.

An extrusion temperature proper to stably obtain an unstretched melt-shaped article is suitably decided in a range in which a desired wall thickness, width and the like of the melt-shaped article can be stably secured considering physical properties inclusive of the melt index of the polymer alloy and operating conditions of the extruder such as a discharge amount, cooling conditions and a winding speed to be employed. In general, the extrusion temperature is in the range of from (Tm+20° C.) to (Tm+100° C.) on the basis of the melting point of the polymer alloy, that is, the melting point (Tm) of the polyolefin contained therein. When the molding is carried out at a temperature less than the lower limit of this temperature range, the unstretched melt-shaped article is highly oriented, but the maximum stretch quantity lowers at the time of the porous state formation in the subsequent stretch step, so that it is unpreferably difficult to obtain the sufficiently high porosity. Conversely, in the case that the molding is carried out at a temperature more than the upper limit of the above-mentioned temperature range, it is also unpreferably difficult to obtain the sufficiently high porosity.

In the case of the formation of the hollow fiber membrane, in order to achieve the high orientation and high crystallization of the unstretched hollow fiber obtained by melt-spinning, a spinning draft is preferably from 10 to 10000, more preferably 1000 to 10000. When the spinning draft is in excess of this upper limit, the porous state formation is poor, and a large pore diameter cannot be obtained unpreferably. Furthermore, when the spinning draft is less than 10, the formation of the lamella crystal structure is poor, so that it is difficult to form the good porous membrane structure even through the subsequent stretch step. The unstretched hollow fiber obtained by the melt-spinning preferably has an internal diameter of from 50 to 2000 μm and a film thickness of from 10 to 200 μm, but if necessary, they may deviate from these range.

In the case of the tubular or flat articles, it is preferable to draw them at a draft of from 1 to 5000, more preferably from 10 to 2000. In order to stably draw the film from the die to contacting rollers, the film is preferably rapidly cooled immediately after the die, and for this cooling, it is preferable to use an air-knife or another tool.

The thus obtained unstretched shaped article is subjected to a heat (annealing) treatment at a temperature of more than the crystallization temperature of the polyolefin (Y) contained in the polymer alloy and less than Tm under a standard length or in a loose state in order to heighten the crystallinity of the shaped article. The longer this treatment time is, the better, but considering economy, the treatment time is within about 48 hours, and it is preferably from about 3 to 48 hours.

The article subjected to the annealing treatment is then stretched to make itself porous. In this case, a stretch method comprising a combination of cold stretch and hot stretching is usually employed. That is, the cold stretch is first carried out in a temperature range between Tg–15° C. of the hydrophilic copolymer (X) and the plastic deformation temperature of the polyolefin (Y) in its polymer alloy, and then the hot stretching follows in a temperature range of about (Tm–60° C.) to (Tm–5° C.). Each of the cold stretch step and the hot stretching step may comprise a multi-stage stretch process of two or more steps.

The lower limit of the cold stretch temperature is Tg of the hydrophilic copolymer (X) in a drying state, but when the hydrophilic copolymer (X) absorbs humidity, the stretch is possible even at a temperature less than Tg. Thus, Tg–15° C. can be considered to be the standard of the lower limit of the cold stretch.

A stretch quantity in the cold stretch is preferably from 20 to 150%. When the cold stretch quantity is less than 20%, the porosity of the obtained porous membrane is low, and when it is more than 150%, the pore diameter decreases unpreferably.

The stretch quantity can be set so that the total stretch quantity in both the cold stretch step and the hot stretching step may be, for example, from 100 to 700%. When the total stretch quantity is less than 100%, the porosity is low, and when it is more than 700%, the shaped article is often cut unpreferably at the time of the stretch step. The porous membranes having various porous structures, pore diameters and porosities can be obtained by changing the conditions of stretch, for example, a temperature ratio between the cold stretch the hot stretching and a stretch ratio.

In the porous membrane obtained by stretching the film to make it porous, the stability of the conformation is substantially secured by the hot stretching, but if necessary, heat setting may be carried out in a temperature range of from (Tm–60° C.) to (Tm–5° C.) under tension or in a restriction relief condition in which a shrinkage factor is restricted. In this case, the shrinkage factor depends upon the total stretch quantity, and when the total stretch quantity is large, the high relief ratio can be used and, for example, the shrinkage may be given as much as about 50%. In general, a shrinkage factor of 40% or less is employed.

In order to heighten the hydrophilic nature of the membrane, the obtained membrane may be further treated with warm water or water vapor having a temperature of from 50° to 120° C., if necessary.

In the case that the hydrophilic nature of the porous membrane is heightened by the warm water treatment, the porous membrane obtained by the melt-shaping type stretch method is preferably immersed into warm water in a temperature range of not less than the glass transition temperature of the hydrophilic copolymer (X) and less than Tm. An immersion time is one minute or more, and preferably from 3 to 10 minutes.

It can be presumed that when the porous membrane is immersed in the warm water in this temperature range, the molecules of the hydrophilic copolymer (X) moves and transfers to the film surface inclusive of pore surfaces of the porous membrane, so that the hydrophilic nature is improved. In this connection, when the temperature of warm water is Tm or more, crystalline components in the porous membrane might melt and then clog the pores unpreferably.

The porous membrane immersed in warm water in this way is taken out from the warm water and then dried preferably at not more than a crystal dispersion temperature of the polyolefin (Y). At this time, if the porous membrane is dried at a temperature more than the crystal dispersion temperature of the polyolefin (Y), the molecular segment of the hydrophilic copolymer (X) transferred to the surface of the porous membrane might be entrained into the polyolefin region again, so that the hydrophilic nature might deteriorate unpreferably.

As a technique for further improving the hydrophilic nature of the porous membrane, a treatment with an alcohol may be carried out.

This alcohol treatment can be achieved by immersing the porous membrane in an alcohol/water mixing solution in which the content of an alcohol represented by the formula

wherein each of m and n is an integer and meets $m \leq 5$ and $n=2m+1$, is from 2 to 95% by volume. An immersion time is 3 seconds or more, and even if the immersion is carried out for 30 seconds or more, such a long time is meaningless. No restriction is put on an immersion temperature, so long as it permits the immersion, and for example, the immersion is sufficiently achieved at room temperature.

Typical examples of the alcohol which is used in this treatment include ethyl alcohol, butyl alcohol and pentyl alcohol.

For the preparation of a hydrophilic fiber from the polymer alloy of the present invention, there can be used various spinning methods such as a melt spinning method and a wet spinning method, but in view of the characteristics of the polymer alloy of the present invention, the melt spinning method is preferable. In the case of the melt spinning method, it is preferable to melt and spin the polymer alloy at its melting point, i.e., at a temperature of from (Tm +10° C.) to (Tm+100° C.) on the basis of the melting point (Tm) of the polyolefin (Y) contained in the polymer alloy.

In the case of the formation of the fiber, a blend ratio between the hydrophilic copolymer (X) and the polyolefin (Y) can be selected in compliance with a desired application of the fiber, but for example, the blend ratio exemplified in the previous description regarding the porous membrane can be employed.

The obtained fiber has a hydrophilic nature and an antistatic function and is useful as a material for clothes and various fiber products in which the antistatic properties are required. In addition, since the fiber is hydrophilic, dyeing is easy.

In order to give a porous structure to the hydrophilic fiber, a wet method, a combination method of melt spinning and extraction, and a melt-shaping type stretch method can be utilized, as described in the preparation of the porous membrane. Above all, the stretch method of the combination of the melt shaping and the stretch for giving the porous nature is preferable, because this method permits manufacturing the porous membrane inexpensively on an industrial scale.

In the case of the hydrophilic porous fiber, physical properties such as porosity and tensile strength can be selected in compliance with a desired application.

For example, it is preferable that the porosity is 30% or more in points of lightweight and feeling, and 80% or less in point of strength.

Considering the application of clothes, it is preferable that the tensile strength is from 0.5 to 6 g/d and the tensile elongation is from to 150%.

Now, reference will be made to the preparation of the porous fiber from the polymer alloy of the present invention in accordance with the melt-shaping type stretch method.

In the first place, the above-mentioned hydrophilic copolymer (X) and the polyolefin (Y) are melted and blended in a desired mixing ratio by means of a twin-screw extruder, a Banbury mixer or the like, and then pelletized.

Next, this polymer alloy pellets are melted and spun by means of a usual spinning machine, and then wound up as an unstretched fiber. A spinning temperature is preferably in the range of from (Tm +20° C.) to (Tm +80° C.). If the spinning is carried out at a temperature lower than this temperature range, the obtained unstretched fiber is highly oriented, but a maximum stretch quantity cannot be heightened at the time of the porous state formation in the subsequent stretch step, so that it is unpreferably difficult to obtain the sufficiently high porosity. Conversely, if the spinning is carried out at a temperature more than the upper limit of the above-mentioned temperature range, it is also unpreferably difficult to obtain the sufficiently high porosity.

For the purposes of carrying out the stable spinning and heightening the crystallinity of the spun unstretched fiber, it is preferable to dispose a slow cooling section having a length of from about 1 to 3 m and an atmospheric temperature of from about 50° to 100° C. just under a spinneret.

If the length of the slow cooling section is less than 1 m, or if the atmospheric temperature is less than 50° C., the fiber is often cut just under the spinneret and a process stability unpreferably tends to deteriorate.

Conversely, if the length of the slow cooling section is more than 3 m, or if the atmospheric temperature is more than 100° C., the cooling of the fiber is poor, so that a substantial draft tends to deteriorate. Thus, such conditions are not preferable in point of the crystal orientation of the obtained unstretched fiber.

With regard to the spinning draft, as compared with the case of a polyolefin single system, somewhat lower conditions are employed. However, the spinning draft is preferably from about 50 to 2000, more preferably about 100 to 1000.

The thus obtained unstretched fiber is subjected to an annealing treatment for I hour or more at a temperature of not less than the crystal dispersion temperature of the polyolefin (Y) contained in the polymer alloy and less than Tm under a standard length or in a loose state in order to heighten its crystallinity. The longer this treatment time is, the better, but considering economy, the treatment time is within about 48 hours, and preferably from about 3 to 24 hours.

The article subjected to the annealing treatment is then stretched to make itself porous. In this case, a stretch method comprising a combination of cold stretch and hot stretching is usually employed. That is, as in the case of the porous membrane, the cold stretch is first carried out in a temperature range between Tg–15° C. of the hydrophilic copolymer (X) and the plastic deformation temperature of the polyolefin (Y) in the polymer alloy, and then the hot stretching follows in a temperature range of from about (Tm–60° C.) to (Tm–5° C.).

Each of the cold stretch step and the hot stretching step may comprise a multi-stage stretch process of two or more steps.

In preparing the fiber from the polymer alloy of the present invention, the cold stretch is an important step. In this step, microcracks are formed in amorphous portions between lamella crystals of the highly oriented crystalline unstretched fiber, and these cracks are enlarged in a thermoplastication stretch step in the subsequent hot stretch step to obtain the above-mentioned specific porous structure. A stretch quantity in the cold stretch step is preferably from 5 to 100%, and it is preferable to set the hot stretching quantity so that the total stretch quantity of both the cold stretch and the hot stretching may be from 100 to 700%. If the hot stretching temperature is higher than about (Tm–5° C.), the stretched fiber becomes transparent, so that the desired porous structure cannot be obtained. It is not preferable that the hot stretching temperature is lower than the above-mentioned range, because the lower the temperature is, the lower the porosity is.

In addition, when the total stretch quantity is in excess of 700%, the fiber is unpreferably often cut at the time of the stretching.

In the thus obtained porous fiber, the substantially formational stability is secured by the hot stretching, but if necessary, heat setting may be carried out in a temperature of from (Tm–60° C.) to (Tm–5° C.) under tension or in a restriction relief condition in which a shrinkage factor is restricted. In this case, the shrinkage factor is 70% or less, usually 50% or less.

Since the polymer alloy of the present invention has the permanent hydrophilic nature, the employment of the polymer alloy permits obtaining various molded articles having the permanent hydrophilic nature. Furthermore, since hydrophilic groups are present on the surfaces of the molded articles, a structure can be obtained in which charging scarcely occurs, whereby the molded articles having the antistatic function can be obtained.

For example, the hydrophilic nature of the porous membrane for an aqueous liquid treatment comprising the polymer alloy of the present invention is permanent properties imparted by the material itself, and it is different from a temporary constitution given by treating a porous membrane comprising the polyolefin with a hydrophilic agent such as an alcohol or a surface-active agent.

Therefore, in the porous membrane prepared from the polymer alloy of the present invention, there is no problem that when the membrane is died, the hydrophilic nature is lost, as in the case of the polyolefin porous membrane.

In the case of the polyolefin porous membrane, the hydrophilic agent is sufficiently required to be washed and removed prior to its use for the purpose of preventing a liquid to be treated from being contaminated with the hydrophilic agent after the treatment using the hydrophilic agent. On the contrary, for the porous membrane obtained from the polymer alloy of the present invention, such a complex treatment is unnecessary.

In addition, the polymer alloy of the present invention is suitable for the manufacture of the porous membranes or porous fibers by the use of the industrially advantageous melt-shaping stretch method, and therefore it is possible to decrease a manufacturing cost.

Now, the present invention will be described in more detail in reference to examples, but the scope of the present invention should not be limited to these examples.

Incidentally, in the following examples, saponification values of hydrophilic copolymers and electrical resistance values on fiber surfaces were measured as follows.

Measurement procedure of a saponification value:

0.3 part by weight of a hydrophilic copolymer obtained by a reaction, 100 parts by weight of ethanol, 20 parts by weight of a 1/10N sodium hydroxide solution and 20 parts by weight of water were mixed, stirred and reacted at 70° C. for 4 hours in a vessel. Next, the resultant slurry was mixed with 20 parts by weight of 1/10 sulfuric acid and a small amount of phenolphthalein as an indicator. A 1/10N aqueous sodium hydroxide solution was added dropwise to the mixture through a burette to obtain a volume required for neutralization, and a saponification value was then calculated therefrom.

Measurement procedure of an electrical resistance:

A surface electrical resistance ($\Omega\square$) was measured in an atmosphere having a temperature of 20° C. and a relative humidity of 40% under a voltage of 1000 V by the use of an electrical resistance measuring device (Supermegaohm Model SM-5, made by Toa Denpa Kogyo Co., Ltd.).

EXAMPLE 1

In a vessel, 100 parts by weight of an ethylene-vinyl acetate copolymer having an ethylene unit content of 29 mole %, 800 parts by weight of methanol, 20 parts by weight of water and 0.1 part by weight of sodium hydroxide were mixed, and the mixture was then reacted at 40° C. for 3 hours. After completion of the reaction, the reaction mixture was added to water at 65° C., and the resultant water-containing hydrophilic copolymer in the state of cake-like masses was taken out therefrom. The copolymer was put between the mutually engaging rollers of a mangle and then squeezed times, while water was sprayed, and it was placed in a hot air dryer and then dried at 70° C. for 4 hours to obtain a dried hydrophilic copolymer product. The saponification value of the thus obtained hydrophilic copolymer was 60%. The composition of the hydrophilic copolymer could be calculated from this saponification value. That is, this hydrophilic copolymer contained 29 mole % of an ethylene unit, 42.6 mole % of a vinyl alcohol unit and 28.4 mole % of a vinyl acetate unit. Furthermore, the Tg (in a dry state) of the hydrophilic copolymer was 30° C.

20% by weight of the hydrophilic copolymer was kneaded with 80% by weight of a high-density polyethylene (Hizex 2200J, made by Mitsui Petrochemical Industries, Ltd., Tg=–120° C., plastic deformation temperature =80° C., melting point =135° C.) at 160° C. by an extruder to obtain pellets.

EXAMPLE 2

In a vessel, 100 parts by weight of an ethylene-vinyl alcohol copolymer having an ethylene unit content of 32 mole %, 120 parts by weight of water, 650 parts by weight of glacial acetic acid and 30 parts by weight 10N hydrochloric acid were mixed, and the mixture was then reacted at 50° C. for 3 hours. Afterward, the reaction mixture was mixed with water a pH of which was adjusted to 10 with sodium hydroxide, and the resultant hydrophilic copolymer masses were treated in the same manner as in Example 1 to obtain a dried hydrophilic copolymer. The acetyl value of the obtained hydrophilic copolymer was 35% (saponification value 65%), and its Tg (in a dry state) was 28° C.

20% by weight of the hydrophilic copolymer was kneaded with 80% by weight of a high-density polyethylene (Hizex 2200J, made by Mitsui Petrochemical Industries, Ltd.) at 160° C. by an extruder to obtain pellets.

Comparative Example 1

In a vessel, 100 parts by weight of an ethylene-vinyl alcohol copolymer having an ethylene unit content of 29 mole %, 500 parts by weight of water, 20 parts by weight of glacial acetic acid and 20 parts by weight 10 N hydrochloric acid were mixed, and the mixture was then reacted at 40° C. for 4 hours. Afterward, the reaction mixture was mixed with water a pH of which was adjusted to 10 with sodium hydroxide, and the resultant hydrophilic copolymer masses were treated in the same manner as in Example 1 to obtain a dried hydrophilic copolymer. The acetyl value of the obtained hydrophilic copolymer was 10% (saponification value 90%), and its Tg (in a dry state) was −10° C.

20% by weight of the hydrophilic copolymer was kneaded with 80% by weight of a high-density polyethylene (Hizex 2200J, made by Mitsui Petrochemical Industries, Ltd.) at 160° C. by an extruder to obtain pellets.

Comparative Example 2

In a vessel, 100 parts by weight of an ethylene-vinyl alcohol copolymer having an ethylene unit content of 29 mole %, 700 parts by weight of methanol, 20 parts by weight of water and 2 parts by weight of sodium hydroxide were mixed, and the mixture was then reacted at 40° C. for 3 hours. Afterward, the same procedure as in Example 1 was carried out to obtain a dried hydrophilic copolymer. The saponification value of the obtained hydrophilic copolymer was 65%, and its Tg (in a dry state) was 28° C.

Furthermore, this hydrophilic copolymer was inspected by the use of a scanning thermal analyzer, and as a result, a melting point attributed to the crystals of the vinyl alcohol unit was observed. In consequence, it was found that this copolymer was crystalline.

20% by weight of the hydrophilic copolymer was kneaded with 80% by weight of a high-density polyethylene (Hizex 2200J, made by Mitsui Petrochemical Industries, Ltd.) at 160° C. by an extruder to obtain pellets.

Example 3

Each of the pellets obtained in Examples 1 and 2 as well as Comparative Examples 1 and 2 was spun at a spinning temperature of 145° C. at a spinning velocity of 200 m/minute at a spinning draft of 1000, while air was introduced into the hollow portion of a hollow fiber under a self-feed system by the use of a nozzle for hollow fiber manufacture of a double-tubular structure having a discharge mouth diameter of 28 mm and an annular slit width of 3.5 mm, and the resultant unstretched hollow fiber was wound up around a bobbin. From the pellets of Examples 1 and 2 as well as Comparative Example 1, the unstretched hollow fibers having no unevenness on the outer wall surfaces thereof were formed, but as for the unstretched hollow fiber obtained from the pellets of Comparative Example 2, many unevennesses were observed on its outer wall surface.

Each of the obtained unstretched hollow fibers was subjected to a heat (annealing) treatment at 110° C. at a standard length for 8 hours. Next, the unstretched hollow fiber subjected to the annealing treatment was cold-stretched at 25° C. as much as 80%. In this cold stretch step, the unstretched hollow fibers obtained from the pellets of Examples 1 and 2 as well as Comparative Example 1 could be stretched, but the unstretched hollow fiber obtained from the pellets of Comparative Example 2 was often cut and could not be stretched.

Next, each cold-stretched hollow fiber was further hot-stretched in a hot box heated to 110° C. and having a length of 2 m. At this time, a stretch quantity (the total stretch quantity) was such as to be 350% of the unstretched fiber.

The hollow fiber subjected to the hot stretching treatment was further subjected to a relaxation heat setting treatment in a hot box heated to 110° C. and having a length of 2 m so that a stretch quantity might be 300% of the unstretched hollow fiber, thereby obtaining a porous hollow fiber membrane.

In the thus obtained porous hollow fiber membrane, a slit-like porous structure was observed which was formed by fibrils oriented in a fiber axis direction and crystalline lamella portions mutually joining the fibrils, and this porous structure was substantially uniformly present in a range of from the external surface of its peripheral wall to the internal surface of the hollow portion.

In this hollow fiber membrane, the orientation of the fibrils in a longitudinal direction is predominant as the whole, and so mechanical strength in the longitudinal direction is excellent. In addition, the slit-like pores form a three-dimensionally connected net pore structure, so that they have the retarding effect of clogging, when used.

These hollow fiber membranes prepared from any material of Examples 1 and 2 as well as Comparative Example 1 had the same conformation, an internal diameter of 250 μm, a membrane thickness of 52 μm, a porosity of 62% and a pore diameter (evaluation by a latex particle trapping method: minimum diameter of the latex particles whose 99.5% or more were trapped) of 0.302 μm. The water penetration pressure (which was determined by feeding water to the hollow portion of the hollow fiber membrane, and then measuring the pressure of water which flowed uniformly through the external surface of the hollow fiber membrane) of the porous hollow fiber membrane prepared from the material of Example 1 was 0.3 kg/cm$^2$, and that of the porous hollow fiber membrane prepared from the material of Example 2 was 0.05 kg/cm$^2$, which meant that the water permeability was good.

However, with regard to the hollow fiber membrane prepared from the material in Comparative Example 1, any water penetration was not observed even under a water pressure of kg/cm$^2$.

Each hollow fiber membrane was immersed in warm water at 90° C. for 5.minutes, and the change of the water penetration pressure was observed. As a result, the water penetration pressure was 0.1 kg/cm$^2$ in the case of the hollow fiber membrane prepared from the material of Example 1 and 0.01 kg/cm$^2$ in the case of the hollow fiber membrane prepared from the material of Example 2, but in the case of the hollow fiber membrane prepared from the material of Comparative Example 1, a water permeability was poor, and the water penetration pressure was 4.5 kg/cm$^2$.

Each hollow fiber membrane was immersed in a 10% by volume aqueous ethyl alcohol solution for 20 seconds and then dried, and afterward, the water penetration pressure was measured. As a result, the water penetration pressure of the hollow fiber membrane prepared from the material of Example 1 was 0.05 kg/cm$^2$, and that of the hollow fiber membrane prepared from the material of Example 2 was less than 0.01 kg/cm$^2$ and thus a differential pressure was too low to measure the water penetration pressure. On the contrary, the water penetration pressure of the hollow fiber membrane prepared from the material of Comparative Example 1 was 4.0 kg/cm$^2$, which meant that the water permeability was still bad.

Example 4

Each of the pellets obtained in Examples 1 and 2 as well as Comparative Examples 1 and 2 and a high-density polyethylene (Hizex 2200J, made by Mitsui Petrochemical Industries, Ltd.) was respectively spun at a spinning temperature of 155° C. at a spinning draft of 5000 at a spinning velocity of 250 m/minute by the use of a nozzle for fiber manufacture having an orifice diameter of 1 mm and 40 orifices, and the resultant fiber was wound up around a bobbin.

In the case that the materials of Examples 1 and 2 as well as Comparative Example 1 were used, the fibers having no unevenness on their surfaces were obtained, but in Comparative Example 2, the obtained fiber had many unevennesses on its surface and was often cut.

As indications for evaluating the mechanical strength of the thus obtained fibers, there were measured tensile strength and tensile elongation, and as an indication for charging properties on the surface of the fiber, there were measured electrical resistance values on the surfaces of the fibers.

The obtained results are shown in Table 1.

TABLE 1

| Sample (material) | Mechanical Strength *) | | Electical Resistance on Surface ($\Omega/\square$) |
|---|---|---|---|
| | Tensile Strength (g/d) | Tensile Elongation (%) | |
| Example 1 | 0.6 | 600 | $4 \times 10^9$ |
| Example 2 | 0.7 | 700 | $2 \times 10^9$ |
| Comp. Ex. 1 | 0.7 | 700 | $7 \times 10^{12}$ |
| High-density Polyethylene | 1.0 | 800 | $1 \times 10^{15}$ |

*) Sample length: 5 cm
Tensile velocity: 5 cm/min.
Full scale: 500 g
Number of measured samples: 10 in each test
Atmosphere: temperature of 20° C., relative humidity of 65%

As is apparent from the results in Table 1, the fibers prepared from the materials of Examples 1 and 2 had a high mechanical strength and low charging properties on the surfaces thereof, and so they had excellent properties as antistatic materials without charging properties, or as antistatic materials with destaticizing properties.

Example 5

30 parts of an ethylene-vinyl alcohol copolymer containing 26 mole % of an ethylene unit obtained by a usual process were placed in a reaction vessel containing 40 parts by weight of water, 200 parts by weight of glacial acetic acid and 10 parts by weight of 10N hydrochloric acid, and they were reacted at a temperature of 40° C. for 4 hours to obtain a copolymer [a hydrophilic copolymer (X)] of ethylene, vinyl alcohol and vinyl acetate The ratio of the ethylene unit, the vinyl alcohol unit and the vinyl acetate unit in the copolymer was 26:45:29.

This hydrophilic copolymer and a high-density polyethylene (Hizex 2200J, made by Mitsui Petrochemical Industries, Ltd.) were melted and headed in a ratio of 20:80 (by weight) by the use of a twin-screw extruder to obtain pellets, followed by drying.

Next, the pellets were fed to a spinning machine provided with a spinning tube having a length of 2 m just under a spinneret, and a fiber was spun through the spinneret having an orifice diameter of 1.0 mm and 40 orifices at a spinning temperature of 155° C. and then wound up around a bobbin at a spinning draft 314 at a spinning velocity of 250 m/minute. The thus obtained unstretched fiber was subjected to a heat treatment in a nitrogen atmosphere at 115° C. at a standard length for 24 hours.

Next, the unstretched fiber subjected to the heat treatment was cold-stretched at 25° C. as much as 80%, and hot stretching was then carried out in a hot box heated to 115° C. and having a length 2 m till the total stretch quantity reached 520%. In addition, a relaxation heat setting treatment was performed in a hot box heated to the same temperature and having a length of 2 m so that the total stretch quantity might be 400%.

The thus obtained porous fiber had a porous structure in which slit-like spaces surrounded with lamellas and many fibrils mutually joining the lamellas and aligned in a longitudinal direction over the whole of from the fiber surface to the center are connected to one another. Thus, the porous fiber had very soft feeling. Moreover, with regard to the porous fiber, porosity was 61.3%, tensile strength was 3.24 g/d, and tensile elongation was 47.6%.

Next, 1 gram of this porous fiber was immersed in 200 cc of ion-exchanged water for 1 hour and then dehydrated for minutes at 1000 rpm by means of a centrifugal separator. Afterward, a weight increase ratio was measured and a water content was determined therefrom. It was 123%.

Example 6

30 parts by weight of an ethylene-vinyl alcohol copolymer containing 26 mole % of an ethylene unit obtained by a usual process were placed in a reaction vessel containing 80 parts by weight of water, 200 parts by weight of glacial acetic acid and 10 parts by weight of N hydrochloric acid, and they were then reacted at a temperature of 40° C. for 4 hours to obtain a copolymer [a hydrophilic copolymer (X)] of ethylene, vinyl alcohol and vinyl acetate. The ratio of the ethylene unit, the vinyl alcohol unit and the vinyl acetate unit in the copolymer was 26:59:15.

This hydrophilic copolymer and a high-density polyethylene (Hizex 2200J, made by Mitsui Petrochemical Industries, Ltd.) were melted and kneaded in a ratio of 15:85 (by weight) by the use of a twin-screw extruder to obtain pellets, followed by drying.

Next, the pellets were treated in the same manner as in Example 5 to prepare a porous fiber. The thus obtained porous fiber had the same slit-like pores as in Example 5. Moreover, with regard to the porous fiber, porosity was 64.5%, tensile strength was 3.62 g/d, and tensile elongation was 49.5%. According the same measuring procedure as in Example 5, a water content was 144%.

We claim:

1. A method for preparing a hydrophilic porous membrane which comprises the steps of melting-shaping a polymer alloy obtained by blending a polyolefin (Y) with an amorphous hydrophilic copolymer (X) containing 10 mole % or more of ethylene units, 20 to 80 mole % of vinyl alcohol units and 1 mole % or more of vinyl acetate units, the melt-shaping being performed at a temperature in the range of from a temperature 10° C. higher to a temperature 100° C. higher than the melting point of the polyolefin (Y), subjecting the melt-shaped article to a heat treatment at a temperature more than the crystal dispersion temperature and less than the melting point of the polyolefin (Y), and then stretching the material to make it porous.

2. A method for preparing a porous membrane which comprises the step of immersing the porous membrane obtained by a method according to claim 1 in water in a temperature range of not less than the glass transition temperature of the hydrophilic polymer alloy constituting the porous membrane.

3. A method for preparing a porous membrane which comprises the step of immersing the porous membrane obtained by a method according to claim 1 in an alcohol/water mixing solution in which the content of an alcohol represented by the formula $C_m H_n OH$ (wherein each of m and n is an integer and $m \leq 5$ and $n = 2m+1$) is from 2 to 95% by volume.

* * * * *